(12) United States Patent
Dikeman

(10) Patent No.: US 10,571,783 B1
(45) Date of Patent: Feb. 25, 2020

(54) CAMERA SUPPORT ADAPTER FOR A TRIPOD

(71) Applicant: Cale Dikeman, Altavista, VA (US)

(72) Inventor: Cale Dikeman, Altavista, VA (US)

( * ) Notice: Subject to any disclaimer, the term of this patent is extended or adjusted under 35 U.S.C. 154(b) by 0 days.

(21) Appl. No.: 16/423,297

(22) Filed: May 28, 2019

(51) Int. Cl.
  *G03B 17/00* (2006.01)
  *G03B 17/56* (2006.01)
  *F16M 11/08* (2006.01)

(52) U.S. Cl.
  CPC .......... *G03B 17/561* (2013.01); *F16M 11/08* (2013.01)

(58) Field of Classification Search
  USPC ......................................... 396/419, 423, 428
  See application file for complete search history.

(56) References Cited

U.S. PATENT DOCUMENTS

| | | | |
|---|---|---|---|
| 2,711,122 A | 6/1955 | Klumpp | |
| 3,351,988 A * | 11/1967 | Jamieson | F16M 13/022 248/231.85 |
| 3,608,794 A | 9/1971 | Mazur | |
| 3,870,209 A | 3/1975 | Mazur | |
| 4,473,177 A | 9/1984 | Parandes | |
| 4,714,184 A | 12/1987 | Young | |
| 5,003,328 A * | 3/1991 | Gaynor | F16M 11/08 248/169 |
| 7,766,562 B2 | 8/2010 | Dowell | |
| D768,755 S | 10/2016 | Thomas | |
| 2005/0265711 A1 * | 12/2005 | Heibel | B60R 11/04 396/419 |
| 2015/0129731 A1 * | 5/2015 | Podlin | F16M 11/08 248/289.11 |
| 2015/0370149 A1 * | 12/2015 | Jackson | G03B 17/561 396/419 |
| 2019/0310535 A1 * | 10/2019 | Kenny | F16M 11/16 |

FOREIGN PATENT DOCUMENTS

CA          2800575          4/2017

* cited by examiner

Primary Examiner — Rodney E Fuller
(74) Attorney, Agent, or Firm — Kyle A. Fletcher, Esq.

(57) ABSTRACT

The camera support adapter for a tripod may prevent a camera from falling to the ground while being attached to or removed from a tripod. In an embodiment, the camera support adapter for a tripod may comprise a swivel plate, a top bushing, a bottom bushing, a camera plate, a tripod head, and one or more straps. The camera plate may be held in place on the bottom of a camera by the tripod head. The swivel plate may couple to a tripod via the top bushing and the bottom bushing. The one or more straps may detachably couple the camera plate to the swivel plate. The one or more straps may limit the distance that a dropped camera may fall and may be detached from the camera plate so that the camera may be carried away from the tripod.

19 Claims, 6 Drawing Sheets

CAMERA SUPPORT ADAPTER FOR A TRIPOD

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of photographic equipment, more specifically, a camera support adapter for a tripod.

SUMMARY OF INVENTION

The camera support adapter for a tripod may prevent a camera from falling to the ground while being attached to or removed from a tripod. In an embodiment, the camera support adapter for a tripod may comprise a swivel plate, a top bushing, a bottom bushing, a camera plate, a tripod head, and one or more straps. The camera plate may be held in place on the bottom of a camera by the tripod head. The swivel plate may couple to a tripod via the top bushing and the bottom bushing. The one or more straps may detachably couple the camera plate to the swivel plate. The one or more straps may limit the distance that a dropped camera may fall and may be detached from the camera plate so that the camera may be carried away from the tripod.

An object of the invention is to prevent a camera from falling to the ground while being attached to or removed from a tripod.

Another object of the invention is to couple the camera to a camera plate by using a tripod head screwed into the bottom of the camera through the camera plate.

A further object of the invention is to couple a swivel plate to the tripod using a top bushing and a bottom bushing such that the swivel plate may swivel around the tripod.

Yet another object of the invention is to allow the swivel plate to detachably couple to the camera plate using one or more straps.

These together with additional objects, features and advantages of the camera support adapter for a tripod will be readily apparent to those of ordinary skill in the art upon reading the following detailed description of the presently preferred, but nonetheless illustrative, embodiments when taken in conjunction with the accompanying drawings.

In this respect, before explaining the current embodiments of the camera support adapter for a tripod in detail, it is to be understood that the camera support adapter for a tripod is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the camera support adapter for a tripod.

It is therefore important that the claims be regarded as including such equivalent construction insofar as they do not depart from the spirit and scope of the camera support adapter for a tripod. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
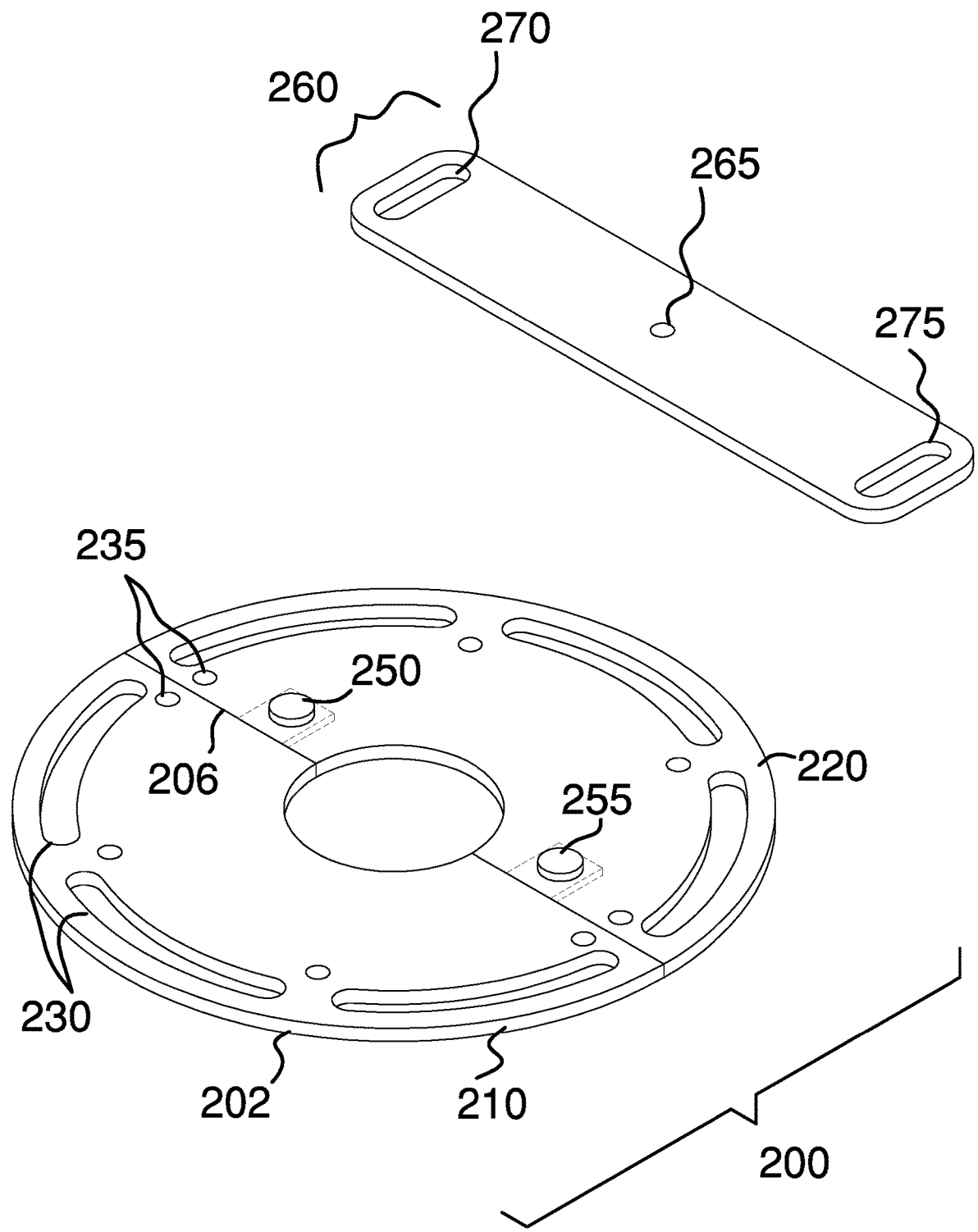
FIG. 1 is a perspective view of an embodiment of the disclosure.
Figure 2:
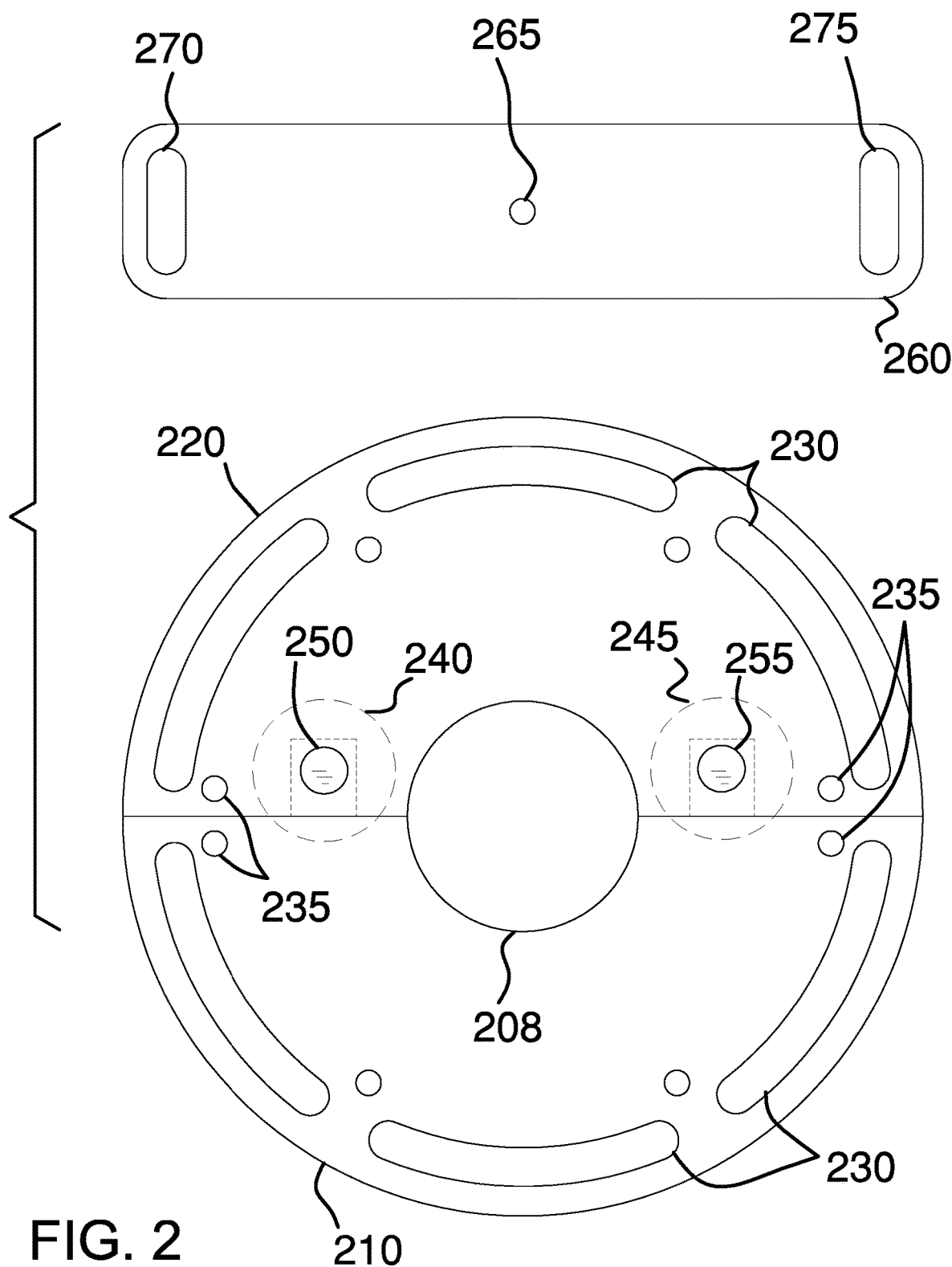
FIG. 2 is a front view of an embodiment of the disclosure illustrating the swivel plate and camera plate.
Figure 3:
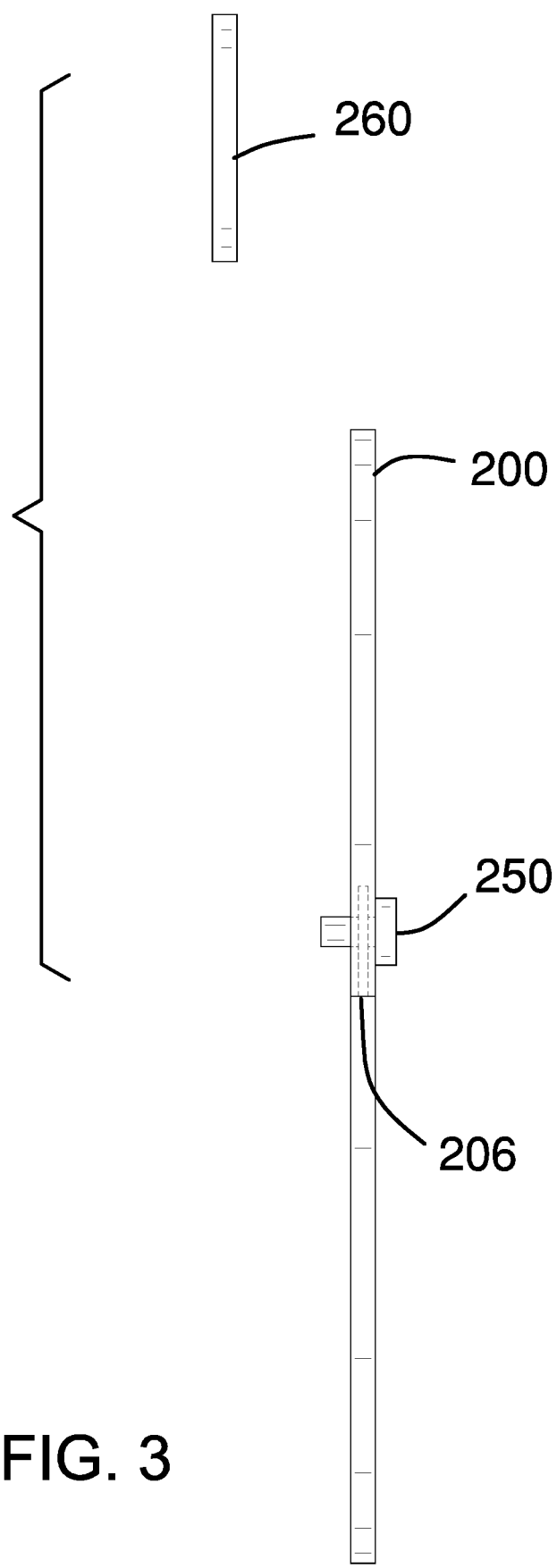
FIG. 3 is a front view of an embodiment of the disclosure illustrating the swivel plate and camera plate.
Figure 4:
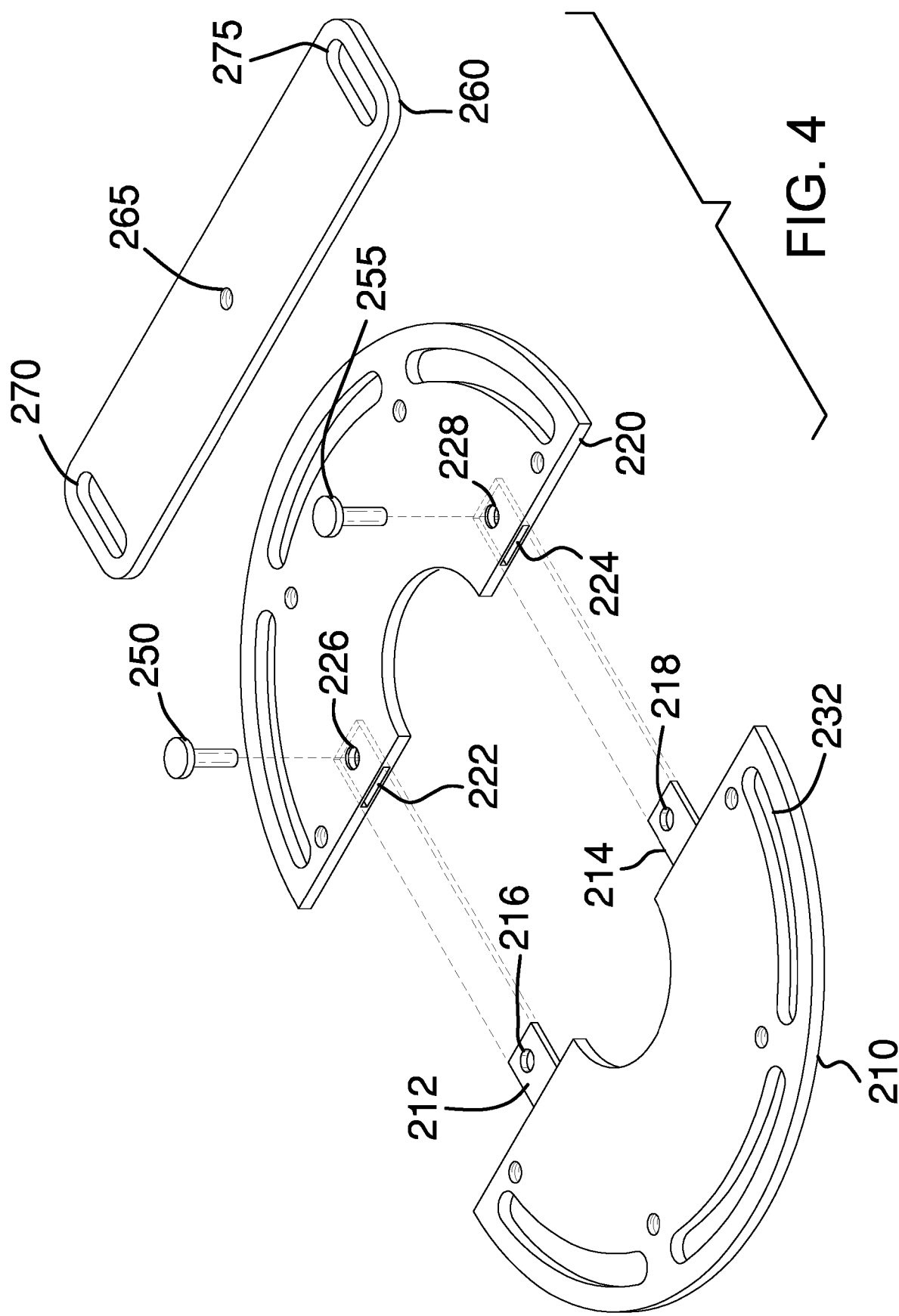
FIG. 4 is am exploded view of an embodiment of the disclosure illustrating the swivel plate and camera plate.
Figure 5:
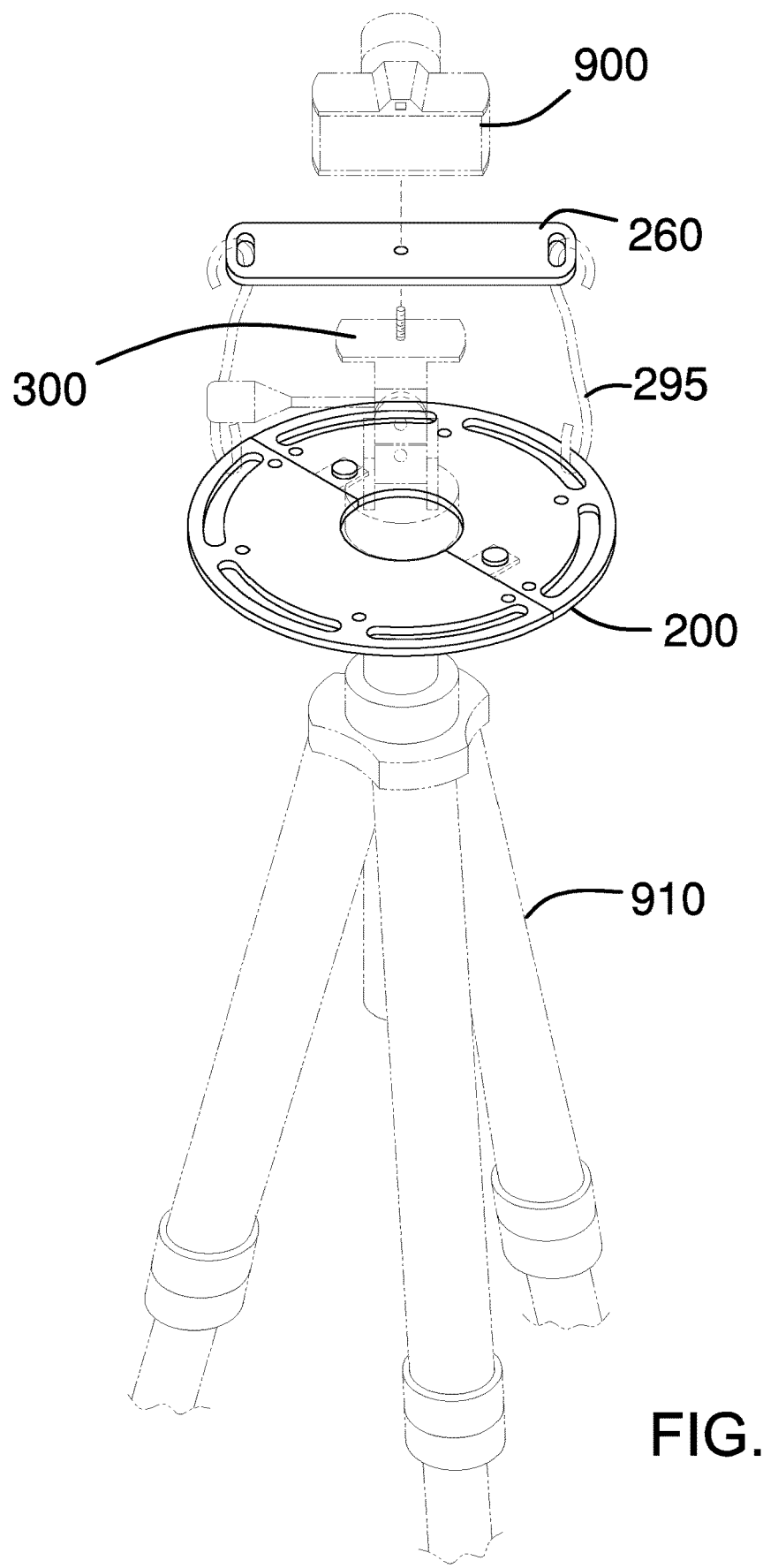
FIG. 5 is an in-use view of an embodiment of the disclosure.
Figure 6:
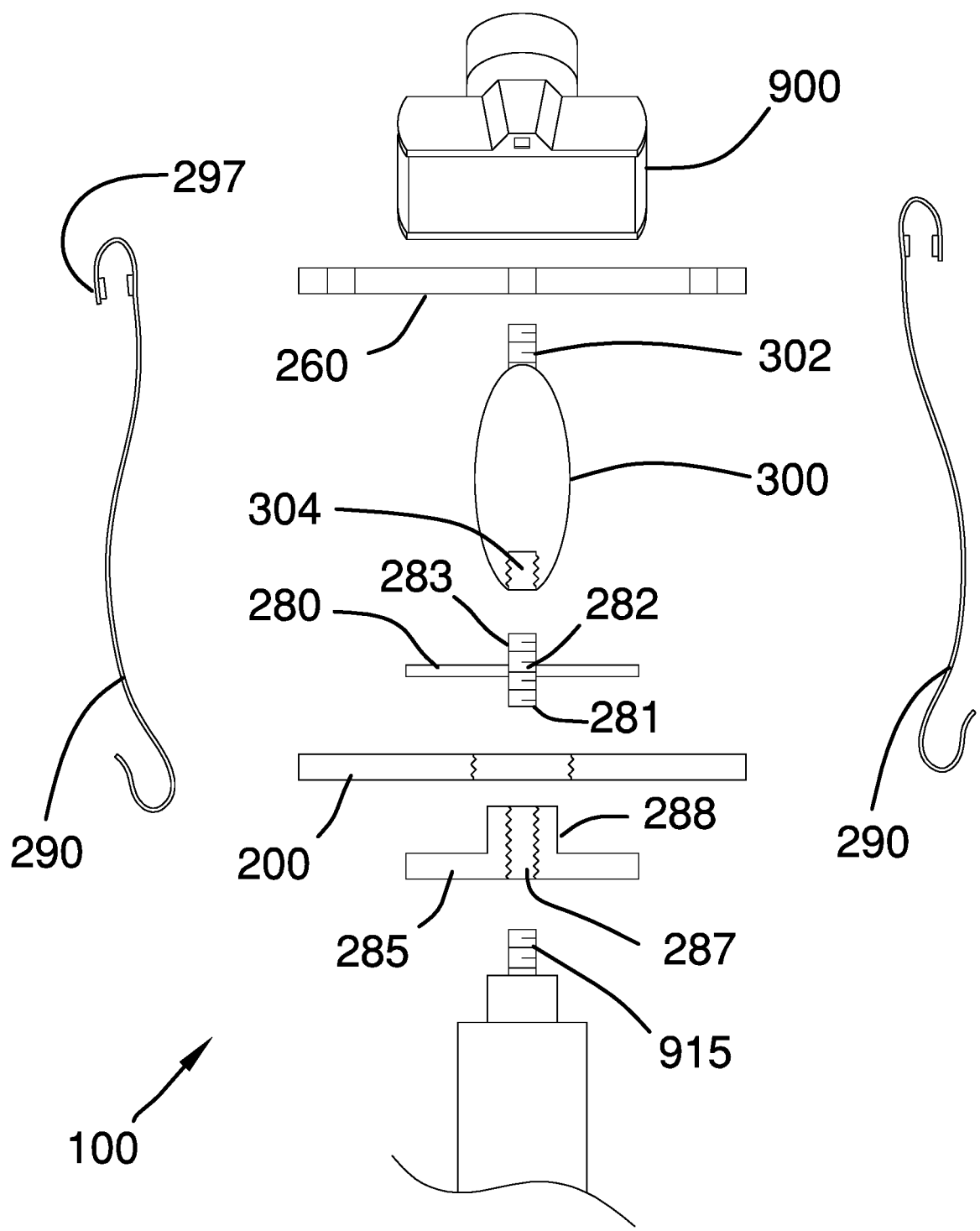
FIG. 6 is a detail side view of an embodiment of the disclosure.

Detailed reference will now be made to a first potential embodiment of the disclosure, which is illustrated in FIGS. 1 through 6.

The camera support adapter for a tripod 100 (hereinafter invention) comprises a swivel plate 200, a top bushing 280, a bottom bushing 285, a camera plate 260, a tripod head 300, and one or more straps 290. The camera plate 260 may be held in place on the bottom of a camera 900 by the tripod head 300. The swivel plate 200 may couple to a tripod 910 via the top bushing 280 and the bottom bushing 285. The one or more straps 290 may detachably couple the camera plate 260 to the swivel plate 200. The one or more straps 290 may prevent the camera 900 from falling if the camera 900 is dropped while being attached to or removed from the tripod 910.

The swivel plate 200 may comprise a first swivel plate half 210 and a second swivel plate half 220. The swivel plate 200 may be a horizontally-oriented annular disk with an outer circumference 202 and an inner circumference 204. The inner circumference 204 may define a swivel aperture 208. The swivel aperture 208 may have a larger diameter than a hub 288 such that the swivel plate 200 is free to rotate around the bottom bushing 285. The swivel plate 200 may separate into the first swivel plate half 210 and the second swivel plate half 220 at a separation line 206. The swivel plate 200 may clamp onto the bottom bushing 285 by placing the first swivel plate half 210 on one side of the hub 288 on the bottom bushing 285, by placing the second swivel plate half 220 on the opposing side of the hub 288, and by coupling the first swivel plate half 210 to the second swivel plate half 220. A first mortise and tenon joint 240 and a second mortise and tenon joint 245 may couple the first swivel plate half 210 to the second swivel plate half 220. The first mortise and tenon joint 240 may comprise a first tenon 212, a first mortise 222, and a first retainer pin 250. The second mortise and tenon joint 245 may comprise a second tenon 214, a second mortise 224, and a second retainer pin 255.

The first swivel plate half 210 may be one half of the swivel plate 200. The first swivel plate half 210 may comprise the first tenon 212 and the second tenon 214. The first tenon 212 may project horizontally from the separation line 206 of the first swivel plate half 210 on one side of the swivel aperture 208. The second tenon 214 may project horizontally from the separation line 206 of the first swivel plate half 210 on the opposing side of the swivel aperture 208. The first tenon 212 and the second tenon 214 may be oriented perpendicularly to the separation line 206. The first tenon 212 may comprise a first tenon retention aperture 216. The second tenon 214 may comprise a second tenon retention aperture 218.

The second swivel plate half 220 may be one half of the swivel plate 200. The second swivel plate half 220 may comprise the first mortise 222 and the second mortise 224. The first mortise 222 may be an indention projecting horizontally into the second swivel plate half 220 on one side of the swivel aperture 208. The second swivel plate half 220 may comprise a first mortise retention aperture 226 which is vertically oriented and passes through the first mortise 222. The second mortise 224 may be an indention projecting horizontally into the second swivel plate half 220 on the opposing side of the swivel aperture 208. The second swivel plate half 220 may comprise a second mortise retention aperture 228 which is vertically oriented and passes through the second mortise 224.

The first tenon 212 and the first mortise 222 may be placed and oriented such that the first tenon 212 may slide into the first mortise 222 when the first swivel plate half 210 is coupled to the second swivel plate half 220. The first retainer pin 250 may be inserted into the first mortise retention aperture 226 and passed through the first tenon retention aperture 216 to retain the first swivel plate half 210 to the second swivel plate half 220. The second tenon 214 and the second mortise 224 may be placed and oriented such that the second tenon 214 may slide into the second mortise 224 when the first swivel plate half 210 is coupled to the second swivel plate half 220. The second retainer pin 255 may be inserted into the second mortise retention aperture 228 and passed through the second tenon retention aperture 218 to retain the first swivel plate half 210 to the second swivel plate half 220.

The swivel plate 200 may comprise a plurality of curved slots 230. The plurality of curved slots 230 may form a non-contiguous circle surrounding the center of the swivel plate 200. An individual curved slot 232 selected from the plurality of curved slots 230 may be an arc-shaped aperture that passes vertically through the swivel plate 200 and subtends an angle measuring between 45 degrees to 90 degrees relative to the center of the swivel plate 200. The individual curved slot 232 may be larger than one of the one or more straps 290 such that one of the one or more straps 290 may pass through the individual curved slot 232.

The swivel plate 200 may comprise a plurality of accessory mounting apertures 235. The plurality of accessory mounting apertures 235 may be vertically oriented apertures for attaching one or more accessories. In some embodiments, the plurality of accessory mounting apertures 235 may be threaded.

The top bushing 280 may be a horizontally-oriented plate that is placed above the swivel plate 200. The top bushing 280 may comprise a threaded shaft 282 that is vertically oriented and located at the center of the top bushing 280. The threaded shaft 282 may project both above and below the top bushing 280. An upward projection 283 of the top bushing 280 may couple to the tripod head 300. A downward projection 284 of the top bushing 280 may couple to the bottom bushing 285.

The bottom bushing 285 may be a horizontally-oriented plate that is placed below the swivel plate 200. The bottom bushing 285 may comprise the hub 288. The hub 288 may be an upward extension of the top face of the bottom bushing 285 and may be circular when viewed from above. The hub 288 may have a diameter that is smaller than the diameter of the bottom bushing 285 and is smaller than the diameter of the top bushing 280. The bottom bushing 285 may further comprise a threaded aperture 287 that is vertically oriented and located at the center of the bottom bushing 285. The downward projection 284 of the threaded shaft 282 on the top bushing 280 may screw into the top of the threaded aperture 287 to couple the top bushing 280 and the bottom bushing 285 with the swivel plate 200 sandwiched between the top bushing 280 and the bottom bushing 285. A threaded tripod screw 915 on the tripod 910 may screw into the bottom of the threaded aperture 287 to couple the bottom bushing 285 to the tripod 910.

The camera plate 260 may comprise a central aperture 265, a first straight slot 270, and a second straight slot 275. The camera plate 260 may be an oblong plate that may couple to the bottom of the camera 900. The central aperture 265 may be a vertically-oriented aperture located at the center of the camera plate 260. The first straight slot 270 and the second straight slot 275 may be elongated apertures located at opposite longitudinal ends of the camera plate 260. The first straight slot 270 and the second straight slot 275 may be oriented such that they extend laterally across the camera plate 260. The first straight slot 270 and the second straight slot 275 may each be larger than one of the one or more straps 290 such that one of the one or more straps 290 may pass through the first straight slot 270 or through the second straight slot 275.

The tripod head 300 may retain the camera plate 260 to the camera 900. Specifically, the tripod head 300 may comprise a threaded head screw 302 that projects upwards vertically from the top, center of the tripod head 300. The threaded head screw 302 may screw into the camera 900 after passing through the central aperture 265 of the camera plate 260 thus retaining the camera plate 260 to the camera 900.

The tripod head 300 may further comprise a threaded head aperture 304. The threaded head aperture 304 may be vertically oriented and located at the bottom center of the tripod head 300. The upward projection 283 of the top bushing 280 may screw into the threaded head aperture 304 to detachably couple the tripod head 300 to the top bushing 280.

In embodiments, the threaded aperture 287, the threaded shaft 282, the threaded head aperture 304, the threaded head screw 302, or combinations thereof may be threaded with either ¼ inch—20 or ⅜ inch—16 threads which are compatible with most cameras and tripods.

The one or more straps 290 may detachably couple the camera plate 260 to the swivel plate 200. An individual strap 295 selected from the one or more straps 290 may couple to the first straight slot 270 on the camera plate 260 or to the second straight slot 275 on the camera plate 260 at one end of the individual strap 295. In some embodiments, the end of the individual strap 295 that couples to the camera plate 260 may pass through the camera plate 260 and may couple to itself using a hook and loop fastener 297.

The other send of the individual strap 295 may couple to one of the plurality of curved slots 230 on the swivel plate 200. The one or more straps 290 may prevent the camera 900 from falling if the camera 900 is dropped while being attached to or removed from the tripod 910. Specifically, because the camera 900 is coupled to the camera plate 260 and the camera plate 260 is coupled to the swivel plate 200 via the one or more straps 290, if the camera 900 is dropped the camera 900 may fall only as far as the one or more straps 290 hanging from the swivel plate 200 will allow.

The invention 100 may allow the camera 900 to be rotated at the top of the tripod 910 because the swivel plate 200 is free to rotate around the top bushing 280. As the camera 900 is rotated, the camera plate 260 is also rotated and the one or more straps 290 may pull on the swivel plate 200 causing the swivel plate 200 to rotate along with the camera 900.

In use, the camera 900 is coupled to the camera plate 260 by passing the threaded head screw 302 through the central aperture 265 of the camera plate 260 and screwing the threaded head screw 302 into the camera 900. The swivel plate 200 is coupled to the top of the tripod 910 by screwing the threaded tripod screw 915 into the threaded aperture 287 of the bottom bushing 285, by screwing the downward projection 284 of the top bushing 280 into the threaded aperture 287 of the bottom bushing 285, and by coupling the first swivel plate half 210 to the second swivel plate half 220 on each side of the hub 288 that is a part of the bottom bushing 285.

The camera 900 may be attached to the tripod 910 by first attaching the one or more straps 290 to the ends of the camera plate 260. Then the upward projection 283 of the threaded shaft 282 on the top bushing 280 may be screwed into the bottom of the tripod head 300. If the camera 900 is dropped while doing this, the one or more straps 290 prevent the camera 900 from falling. Once the tripod head 300 is coupled to the top bushing 280, the camera 900 and the tripod 910 may be used normally.

The camera 900 may be removed from the tripod 910 by unscrewing the upward projection 283 of the threaded shaft 282 on the top bushing 280 from the bottom of the tripod head 300. If the camera 900 is dropped while doing this, the one or more straps 290 prevent the camera 900 from falling. Once the tripod head 300 is free of the top bushing 280, the one or more straps 290 may be detached from the camera plate 260 and the camera 900, the camera plate 260, and the tripod head 300 may be carried away as a unit.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" refers to top and "lower" refers to the bottom. As a non-limiting example, the upper end of a vertical shaft is the top end of the vertical shaft.

As used in this disclosure, an "accessory" is a second object that adds to the convenience or attractiveness of a first object. In some instances, an accessory may extend the functionality of the first object by allowing the combination of the accessory plus the first object to perform a task that the first object could not perform alone.

As used in this disclosure, an "aperture" is an opening in a surface. Aperture may be synonymous with hole, slit, crack, gap, slot, or opening.

As used herein, the words "couple", "couples", "coupled" or "coupling", refer to connecting, either directly or indirectly, and does not necessarily imply a mechanical connection.

As used in this disclosure, a "diameter" of an object is a straight line segment that passes through the center (or center axis) of an object. The line segment of the diameter is terminated at the perimeter or boundary of the object through which the line segment of the diameter runs.

As used in this disclosure, a "fastener" is a device that is used to join or affix two objects. Fasteners generally comprise a first element which is attached to the first object and a second element which is attached to the second object such that the first element and the second element join to affix the first object and the second object. Common fasteners include, but are not limited to, hooks, zippers, snaps, clips, ties, buttons, buckles, quick release buckles, or hook and loop fasteners.

As used in this disclosure, a "hook and loop fastener" is a fastener that comprises a hook surface and a loop surface. The hook surface comprises a plurality of minute hooks. The loop surface comprises a surface of uncut pile that acts like a plurality of loops. When the hook surface is applied to the loop surface, the plurality of minute hooks fastens to the plurality of loops securely fastening the hook surface to the loop surface.

As used in this disclosure, "horizontal" is a directional term that refers to a direction that is perpendicular to the local force of gravity. Unless specifically noted in this disclosure, the horizontal direction is always perpendicular to the vertical direction.

As used in this disclosure, the word "lateral" refers to the sides of an object or movement towards a side. Lateral directions are generally perpendicular to longitudinal directions. "Laterally" refers to movement in a lateral direction.

As used herein, the word "longitudinal" or "longitudinally" refers to a lengthwise or longest direction.

As used herein, a "longitudinal edge" or "longitudinal end" is an edge or end that is reached when traversing an object in a longitudinal direction.

As used in this disclosure, a "mortise" is a cavity formed in a material that is designed to receive a similarly shaped object such that the similarly shaped object is flush to the surface of the material.

As used herein, "oblong" refers to an object that is elongated.

As used in this disclosure, a "plate" is a flat, rigid object having at least one dimension that is of uniform thickness and is thinner than the other dimensions of the object. Plates often have a rectangular or disk like appearance. Plates may be made of any material, but are commonly made of metal.

As used in this disclosure, a "slot" is a long narrow groove, cut, opening, or aperture that is formed in or through an object.

As used in this disclosure a "strap" is a strip of leather, cloth, nylon, plastic, thin metal, rubber, or other flexible material, that is used to fasten, secure, carry, or hold onto something. A strap is sometimes used in conjunction with a buckle.

As used in this disclosure, a "tenon" is a structure that projects away from an edge a first object. The tenon is sized and shaped to fit into a mortise that is formed in a second object such that the first object can be attached to the second object by inserting the tenon in the matching mortise.

As used in this disclosure, a "tripod" is a three legged stand that is used to support a visual recording device.

As used in this disclosure, "vertical" refers to a direction that is parallel to the local force of gravity. Unless specifically noted in this disclosure, the vertical direction is always perpendicular to horizontal.

With respect to the above description, it is to be realized that the optimum dimensional relationship for the various components of the invention described above and in FIGS. 1 through 6, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A camera support adapter for a tripod comprising:
    a swivel plate, a top bushing, a bottom bushing, a camera plate, a tripod head, and one or more straps;
    wherein the camera plate is held in place on the bottom of a camera by the tripod head;
    wherein the swivel plate couples to a tripod via the top bushing and the bottom bushing;
    wherein the one or more straps detachably couple the camera plate to the swivel plate;
    wherein the one or more straps prevent the camera from falling if the camera is dropped while being attached to or removed from the tripod.

2. The camera support adapter for a tripod according to claim 1
    wherein the swivel plate comprises a first swivel plate half and a second swivel plate half;
    wherein the swivel plate is a horizontally-oriented annular disk with an outer circumference and an inner circumference;
    wherein the inner circumference defines a swivel aperture;
    wherein the swivel aperture has a larger diameter than a hub such that the swivel plate is free to rotate around the bottom bushing;
    wherein the swivel plate separates into the first swivel plate half and the second swivel plate half at a separation line.

3. The camera support adapter for a tripod according to claim 2
    wherein the swivel plate clamps onto the bottom bushing by placing the first swivel plate half on one side of the hub on the bottom bushing, by placing the second swivel plate half on the opposing side of the hub, and by coupling the first swivel plate half to the second swivel plate half;
    wherein a first mortise and tenon joint and a second mortise and tenon joint couple the first swivel plate half to the second swivel plate half;
    wherein the first mortise and tenon joint comprises a first tenon, a first mortise, and a first retainer pin;
    wherein the second mortise and tenon joint comprises a second tenon, a second mortise, and a second retainer pin.

4. The camera support adapter for a tripod according to claim 3
    wherein the first swivel plate half is one half of the swivel plate;
    wherein the first swivel plate half comprises the first tenon and the second tenon;
    wherein the first tenon projects horizontally from the separation line of the first swivel plate half on one side of the swivel aperture;
    wherein the second tenon projects horizontally from the separation line of the first swivel plate half on the opposing side of the swivel aperture;
    wherein the first tenon and the second tenon are oriented perpendicularly to the separation line;
    wherein the first tenon comprises a first tenon retention aperture;
    wherein the second tenon comprises a second tenon retention aperture.

5. The camera support adapter for a tripod according to claim 4
    wherein the second swivel plate half is one half of the swivel plate;
    wherein the second swivel plate half comprises the first mortise and the second mortise;
    wherein the first mortise is an indention projecting horizontally into the second swivel plate half on one side of the swivel aperture;
    wherein the second swivel plate half comprises a first mortise retention aperture which is vertically oriented and passes through the first mortise;
    wherein the second mortise is an indention projecting horizontally into the second swivel plate half on the opposing side of the swivel aperture;
    wherein the second swivel plate half comprises a second mortise retention aperture which is vertically oriented and passes through the second mortise.

6. The camera support adapter for a tripod according to claim 5
    wherein the first tenon and the first mortise are placed and oriented such that the first tenon slides into the first mortise when the first swivel plate half is coupled to the second swivel plate half;

wherein the first retainer pin is inserted into the first mortise retention aperture and passed through the first tenon retention aperture to retain the first swivel plate half to the second swivel plate half;

wherein the second tenon and the second mortise are placed and oriented such that the second tenon slides into the second mortise when the first swivel plate half is coupled to the second swivel plate half;

wherein the second retainer pin is inserted into the second mortise retention aperture and passed through the second tenon retention aperture to retain the first swivel plate half to the second swivel plate half.

7. The camera support adapter for a tripod according to claim 6 wherein the swivel plate comprises a plurality of curved slots;

wherein the plurality of curved slots form a non-contiguous circle surrounding the center of the swivel plate;

wherein an individual curved slot selected from the plurality of curved slots is an arc-shaped aperture that passes vertically through the swivel plate and subtends an angle measuring between 45 degrees to 90 degrees relative to the center of the swivel plate;

wherein the individual curved slot is larger than one of the one or more straps such that one of the one or more straps pass through the individual curved slot.

8. The camera support adapter for a tripod according to claim 7 wherein the swivel plate comprises a plurality of accessory mounting apertures;

wherein the plurality of accessory mounting apertures are vertically oriented apertures for attaching one or more accessories.

9. The camera support adapter for a tripod according to claim 8 wherein the plurality of accessory mounting apertures are threaded.

10. The camera support adapter for a tripod according to claim 8 wherein the top bushing is a horizontally-oriented plate that is placed above the swivel plate;

wherein the top bushing comprises a threaded shaft that is vertically oriented and located at the center of the top bushing;

wherein the threaded shaft projects both above and below the top bushing;

wherein an upward projection of the top bushing couples to the tripod head;

wherein a downward projection of the top bushing couples to the bottom bushing.

11. The camera support adapter for a tripod according to claim 10 wherein the bottom bushing is a horizontally-oriented plate that is placed below the swivel plate;

wherein the bottom bushing comprises the hub;

wherein the hub is an upward extension of the top face of the bottom bushing and is circular when viewed from above;

wherein the hub has a diameter that is smaller than the diameter of the bottom bushing and is smaller than the diameter of the top bushing;

wherein the bottom bushing further comprises a threaded aperture that is vertically oriented and located at the center of the bottom bushing;

wherein the downward projection of the threaded shaft on the top bushing screws into the top of the threaded aperture to couple the top bushing and the bottom bushing with the swivel plate sandwiched between the top bushing and the bottom bushing;

wherein a threaded tripod screw on the tripod screws into the bottom of the threaded aperture to couple the bottom bushing to the tripod.

12. The camera support adapter for a tripod according to claim 11 wherein the camera plate comprises a central aperture, a first straight slot, and a second straight slot;

wherein the camera plate is an oblong plate that couples to the bottom of the camera;

wherein the central aperture is a vertically-oriented aperture located at the center of the camera plate;

wherein the first straight slot and the second straight slot are elongated apertures located at opposite longitudinal ends of the camera plate;

wherein the first straight slot and the second straight slot are oriented such that they extend laterally across the camera plate;

wherein the first straight slot and the second straight slot are each larger than one of the one or more straps such that one of the one or more straps pass through the first straight slot or through the second straight slot.

13. The camera support adapter for a tripod according to claim 12 wherein the tripod head retains the camera plate to the camera;

wherein the tripod head comprises a threaded head screw that projects upwards vertically from the top, center of the tripod head;

wherein the threaded head screw screws into the camera after passing through the central aperture of the camera plate thus retaining the camera plate to the camera.

14. The camera support adapter for a tripod according to claim 13 wherein the tripod head further comprises a threaded head aperture;

wherein the threaded head aperture is vertically oriented and located at the bottom center of the tripod head;

wherein the upward projection of the top bushing screws into the threaded head aperture to detachably couple the tripod head to the top bushing.

15. The camera support adapter for a tripod according to claim 14 wherein the threaded aperture, the threaded shaft, the threaded head aperture, the threaded head screw, or combinations thereof are threaded with either ¼ inch—20 or ⅜ inch—16 threads.

16. The camera support adapter for a tripod according to claim 14 wherein the one or more straps detachably couple the camera plate to the swivel plate;

wherein an individual strap selected from the one or more straps couples to the first straight slot on the camera plate or to the second straight slot on the camera plate at one end of the individual strap.

17. The camera support adapter for a tripod according to claim 16 wherein the end of the individual strap that couples to the camera plate passes through the camera plate and couples to itself using a hook and loop fastener.

18. The camera support adapter for a tripod according to claim 16 wherein the other send of the individual strap couples to one of the plurality of curved slots on the swivel plate;

wherein the one or more straps prevent the camera from falling if the camera is dropped while being attached to or removed from the tripod;

wherein because the camera is coupled to the camera plate and the camera plate is coupled to the swivel plate via the one or more straps, if the camera is dropped the camera falls only as far as the one or more straps hanging from the swivel plate will allow.

19. The camera support adapter for a tripod according to claim 18 wherein the camera support adapter for a tripod allows the camera to be rotated at the top of the tripod because the swivel plate is free to rotate around the top bushing;

wherein as the camera is rotated, the camera plate is also rotated and the one or more straps pull on the swivel plate causing the swivel plate to rotate along with the camera.

\* \* \* \* \*